(12) United States Patent
Okada et al.

(10) Patent No.: US 7,931,294 B2
(45) Date of Patent: Apr. 26, 2011

(54) SIDE AIRBAG APPARATUS

(75) Inventors: Izuru Okada, Aichi-ken (JP); Takanori Kanto, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 146 days.

(21) Appl. No.: 12/457,216

(22) Filed: Jun. 4, 2009

(65) Prior Publication Data
US 2009/0309340 A1 Dec. 17, 2009

(30) Foreign Application Priority Data

Jun. 17, 2008 (JP) ................................. 2008-158180

(51) Int. Cl.
*B60R 21/207* (2006.01)
(52) U.S. Cl. .................................. 280/730.2; 280/728.2
(58) Field of Classification Search ............... 280/730.2, 280/728.2
See application file for complete search history.

(56) References Cited

U.S. PATENT DOCUMENTS

| 2006/0113769 A1* | 6/2006 | Tracht | 280/730.2 |
| 2009/0243266 A1* | 10/2009 | Smith | 280/730.2 |

FOREIGN PATENT DOCUMENTS

JP A-2006-137398 6/2006

* cited by examiner

*Primary Examiner* — Ruth Ilan
(74) *Attorney, Agent, or Firm* — Posz Law Group, PLC

(57) ABSTRACT

A side airbag apparatus 23 includes an airbag 27 and a guide member 30, which guides inflation and deployment of the airbag 27. The airbag 27 is fixed to a right side wall 24a of a seat frame 24. A part of the airbag 27 protrudes further forward than a front end 24A of the right side wall 24a. The airbag 27 is supplied with gas from an inflator 26, so as to be inflated and deployed in a space between a body side portion of a vehicle and an occupant seated in a front seat 21. The guide member 30 guides the airbag 27 forward when it is inflated and deployed. The guide member 30 includes a guide portion 30c and a first bending portion 30a, which extends from the guide portion 30c. The guide portion 30c is arranged to face a surface of the airbag 27 facing the interior of the vehicle at least in an area forward of the right side wall 24a. The first bending portion 30a is flexed rightward when receiving load from the left. Also, the first bending portion 30a restricts the guide portion 30c from being flexed leftward when receiving the force of inflation and deployment of the airbag 27.

10 Claims, 7 Drawing Sheets

SIDE AIRBAG APPARATUS

BACKGROUND OF THE INVENTION

The present invention relates to a side airbag apparatus having an airbag that is inflated and deployed in a space on a side of an occupant.

Typically, a side airbag apparatus inflates and deploys an airbag in a space on a side of an occupant when an impact of a magnitude greater than or equal to a predetermined value is applied to the body side portion of a vehicle. By reducing the impact applied to the occupant with the inflated airbag, the apparatus protects the head, the thorax, or the lumbar region. In such a side airbag apparatus, gas is injected to the interior of the airbag by a gas generator so that the airbag is instantly inflated and deployed (for example, Japanese Laid-Open Patent Publication No. 2006-137398).

In this type of side airbag apparatus, sufficient protection of the occupant cannot be achieved simply by inflating and deploying the airbag. That is, the airbag needs to be inflated and deployed into an intended state at an intended location. Therefore, in addition to allowing the airbag to be instantly inflated and deployed, it is important to control the behavior of the airbag in an attempt to inflate and deploy the airbag into a desired condition at a desired position.

In a typical side airbag apparatus, a folded airbag is fixed to a surface of the seat frame of a seatback on a side closer to the outside of the vehicle. The pressure of gas discharged from the gas generator causes the airbag to break through the cover of the seatback and to be inflated and deployed toward the front of the vehicle.

The side airbag apparatus of the above publication has a flat deployment stabilizing plate (guiding member), which guides the airbag such that the airbag is inflated and deployed toward the front of the vehicle. The apparatus has a vertically extending rotary shaft at the front edge of an outer surface (a surface closer to the outside of the vehicle) of the seatback frame (seat frame) of the vehicle. The deployment stabilizing plate is supported by the rotary shaft so as to be pivotable about the rotary shaft. A stopper is fixed to the seat frame at a position inside the deployment stabilizing plate (at a position closer to the center of the vehicle). Inward pivoting of the deployment stabilizing plate is restricted by the stopper.

When an occupant sits in the vehicle seat, the deployment stabilizing plate can receive a force acting from inside the vehicle toward the outside. In this case, the deployment stabilizing plate is pivoted outward to reduce the pressure applied to the occupant, thereby preventing the occupant from being disturbed by the sensation from the seat. On the other hand, when the airbag is inflated and deployed, the deployment stabilizing plate receives a force in a direction from the outside of the vehicle toward the interior. In this case, inward pivoting of the deployment stabilizing plate is restricted by the stopper. This inhibits the airbag from being inflated and deployed toward the interior of the vehicle, and the airbag is guided to be inflated and deployed toward the front of the airbag.

However, after a force acting from inside the vehicle toward the outside is applied to the deployment stabilizing plate of the apparatus of the above publication, and pivots the plate to a position closer to the outside of vehicle, the plate does not return to the original position. Thus, when the airbag is inflated and deployed, the deployment stabilizing plate interferes with the airbag. This results in variations in the direction of inflation and deployment.

SUMMARY OF THE INVENTION

Accordingly, it is an objective of the present invention to provide a side airbag apparatus that accurately inflates and deploys an airbag toward the front of the vehicle, while maintaining the comfortableness of the vehicle seat.

To achieve the foregoing objective and in accordance with one aspect of the present invention, a side airbag apparatus in a seatback of a vehicle seat is provided. The airbag apparatus includes an airbag and a guide member. The airbag is fixed in a folded state to a seat frame of the seatback. When inflated and deployed by the pressure of gas, the airbag protrudes further toward the front of a vehicle than the seat frame and enters the space between a body side portion of the vehicle and an occupant seated in the vehicle seat. The guide member is located between the seat frame and the airbag, and guides the airbag such that the airbag is deployed toward the front of the vehicle when inflated and deployed. The guide member includes a guide portion, a flexible portion, and a restriction portion. The guide portion is located inside of the airbag in the vehicle and arranged along the direction of inflation of the airbag. The flexible portion is flexed toward the outside of the vehicle when receiving a load from inside the vehicle. The restriction portion restricts the guide portion from being flexed toward the interior of the vehicle when receiving a force generated by inflation and deployment of the airbag.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Hereinafter, a side airbag apparatus according to a first embodiment of the present invention will be described with reference to FIGS. 1 to 5. In the description below, the advancing direction of a vehicle is defined as a forward direction of the vehicle, and a front-rear direction is defined in relation to the forward direction. Also, unless otherwise specified, a vertical direction and a left-right direction coincide with the vertical direction and the left-right direction with respect to the vehicle advancing direction.

Figure 1:
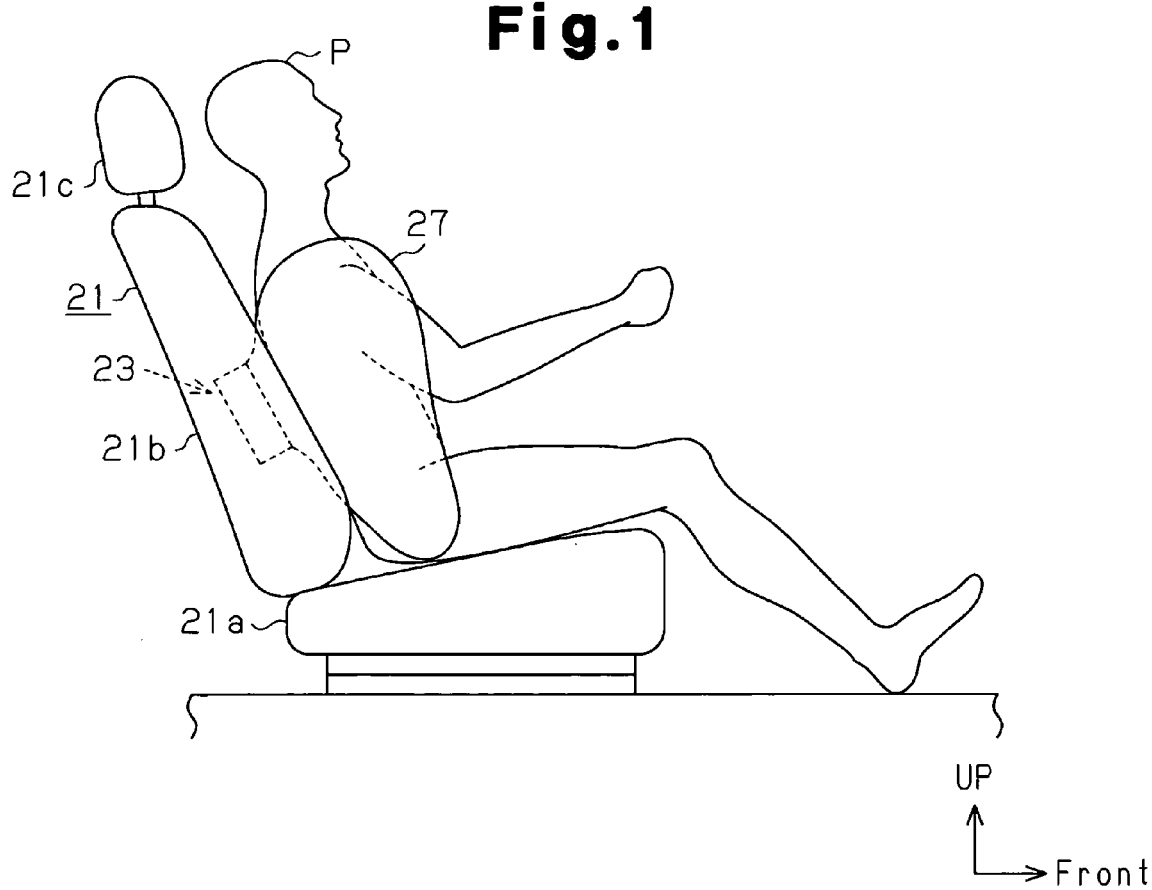
FIG. 1 is a side view of a side airbag apparatus according to a first embodiment of the present invention, illustrating a state in which an airbag has been inflated and deployed.
Figure 2:
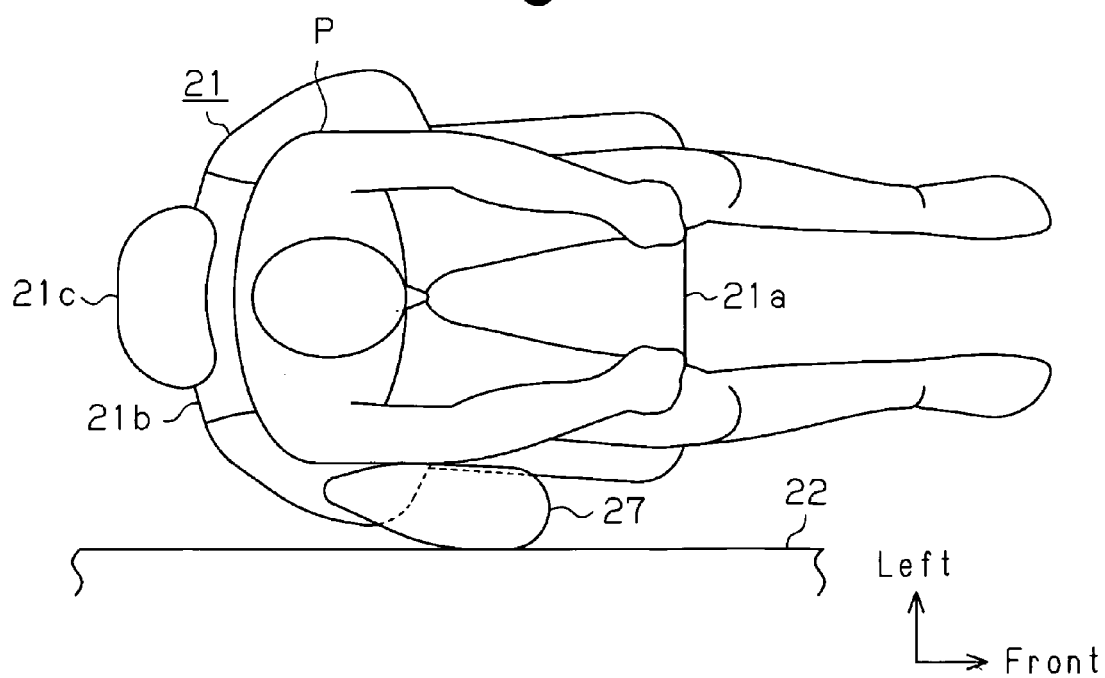
FIG. 2 is a plan view of FIG. 1.

FIGS. 1 and 2 show a vehicle seat, which is a right front seat 21 (driver's seat), arranged in a passenger compartment of a vehicle. The front seat 21 is a bonded seat, which includes a seat frame 24 (FIGS. 3 to 5), a urethane pad (not shown) put over the seat frame 24, and a cover (not shown) adhered to the urethane pad. The front seat 21 is arranged on the floor of the passenger compartment and includes a seat cushion 21a, a seatback 21b, and a headrest 21c. A side airbag apparatus 23 is embedded in a right portion of the seatback 21b. The side airbag apparatus 23 is arranged at a position that corresponds to a door 22, which forms part of a body side portion of the vehicle. Although, FIGS. 1 and 2 only show the right front seat 21, the left front seat (front passenger seat) has the same side airbag apparatus 23 embedded in the left side.

Figure 3:
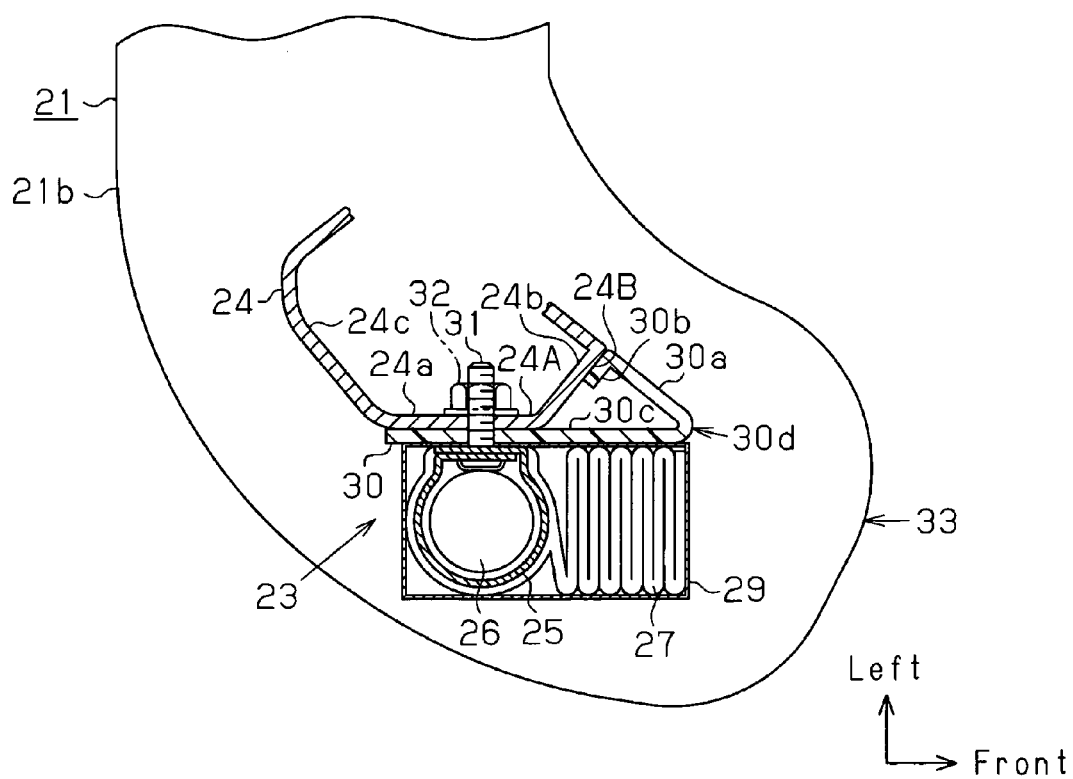
FIG. 3 is a cross-sectional plan view of the side airbag apparatus shown in FIG. 1.

As shown in FIG. 3, a metal seat frame 24 (only part of it is shown) is provided in a right end portion (an end portion closer to the outside of the vehicle) of the seatback 21b. The seat frame 24 includes a plate-like right side wall 24a, a front wall 24b, and a rear wall 24c. The right side wall 24a extends along the front-rear direction and has a front end 24A. The front wall 24b extends diagonally forward left from the front end 24A of the right side wall 24a. The rear wall 24c extends diagonally backward left from the rear end of the right side wall 24a.

The side airbag apparatus 23 includes a retainer 25, a gas generator, which is an inflator 26, and an airbag 27. The retainer 25, which is made of metal, has a cylindrical shape and extends in the up-down direction. The inflator 26, which has a columnar shape, is fixed in the retainer 25 by swaging. The airbag 27 covers the retainer 25 and the inflator 26. Also, the airbag 27 is folded. The retainer 25, the inflator 26, and the airbag 27 are contained in a holding member, which is a retaining cover 29. The retaining cover 29 is polyester unwoven fabric. That is, the airbag 27 is retained in a folded state in the retaining cover 29. The strength of the retaining cover 29 is set to such a value that the cover 29 can be broken by the force generated when the airbag 27 is inflated and deployed.

A plate-like guide member 30 is arranged on a left side surface (the surface closer to the center of the vehicle) of the retaining cover 29. The guide member 30 is made of thermoplastic elastomer (TPO) and substantially covers the entire left side surface of the retaining cover 29. A bolt 31, which extends leftward (toward the interior of the vehicle), is located on the left side surface of the retainer 25. The airbag 27, the retaining cover 29, and the guide member 30 are fastened to the right side surface (the surface closer to the outside of the vehicle) of the right side wall 24a of the seat frame 24 with a bolt 31 and a nut 32.

The airbag 27, which is retained in a folded state by the retaining cover 29, projects further forward than the front end 24A of the right side wall 24a of the seat frame 24. Therefore, the guide member 30 projects further forward than the front end 24A of the right side wall 24a of the seat frame 24. The guide member 30 includes a first bending portion 30a, which serves as a flexible portion and a restriction portion, a second bending portion 30b, which serves as a contact portion, and a guide portion 30c. The first bending portion 30a is formed by bending the front end portion of the guide member 30 diagonally backward left. The second bending portion 30b is formed by bending the distal end portion (rear end portion) of the first bending portion 30a diagonally backward right. The guide portion 30c is arranged to face the entire left side surface (the surface closer to the center of the vehicle) of the airbag 27, which is retained in a folded state by the retaining cover 29. The guide member 30 has a hinge 30d at the boundary between the guide portion 30c and the first bending portion 30a. The thickness of the hinge 30d is slightly less than that of the other portions. The second bending portion 30b contacts a front end 24B of the front wall 24b of the seat frame 24.

The inflator 26 accommodates gas generating agent (not shown) for inflating and deploying the airbag 27. The inflator 26 has at a lower portion gas outlets (not shown) for discharging gas generated by the gas generating agent. The inflator 26 is electrically connected to an impact sensor (not shown) that detects impact applied to the body side portion of the vehicle. When an impact that is greater than or equal to a predetermined value is applied to the body side portion of the vehicle, the gas generating agent in the inflator 26 generates gas based on a detection signal of the impact sensor. The gas is injected into the airbag 27 through the gas outlets. This causes the airbag 27 to break a burst line portion 33 formed in a portion in front of the airbag 27 of the seatback 21b to be inflated and deployed forward. That is, the airbag 27 is inflated and deployed in a space between the vehicle body side portion and an occupant P seated in the front seat 21. Specifically, the airbag 27 is inflated and deployed at a position corresponding to the thorax and the lumbar region of the occupant P. The burst line portion 33 is formed to be weaker than the other portions of the cover of the seatback 21b. The burst line portion 33 is therefore easy to break.

The operation of the side airbag apparatus 23 will now be described.

Figure 4:
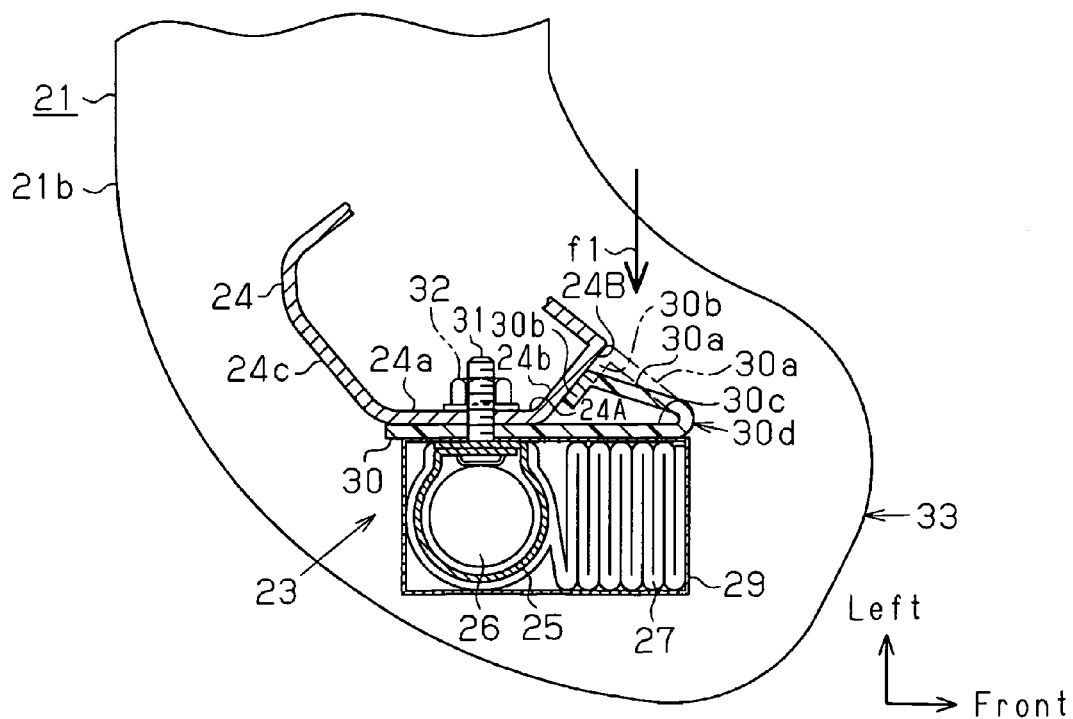
FIG. 4 is a cross-sectional plan view of the side airbag apparatus of FIG. 3, illustrating a state in which a first bending portion of a guiding member is flexed.

When the occupant P sits in the front seat 21 and leans against the seatback 21b, load f1 acts on the first bending portion 30a of the guide member 30 from the left (from inside the vehicle) to the right (toward the outside of the vehicle). Then, as shown in FIG. 4, the first bending portion 30a flexes rightward in a collapsing manner about the hinge 30d serving as a fulcrum. At this time, the second bending portion 30b slides from the front end toward the rear end of the front wall 24b of the seat frame 24. As a result, the occupant P is prevented from feeling disturbed by the guide member 30 when sitting in the front seat 21.

Figure 5:
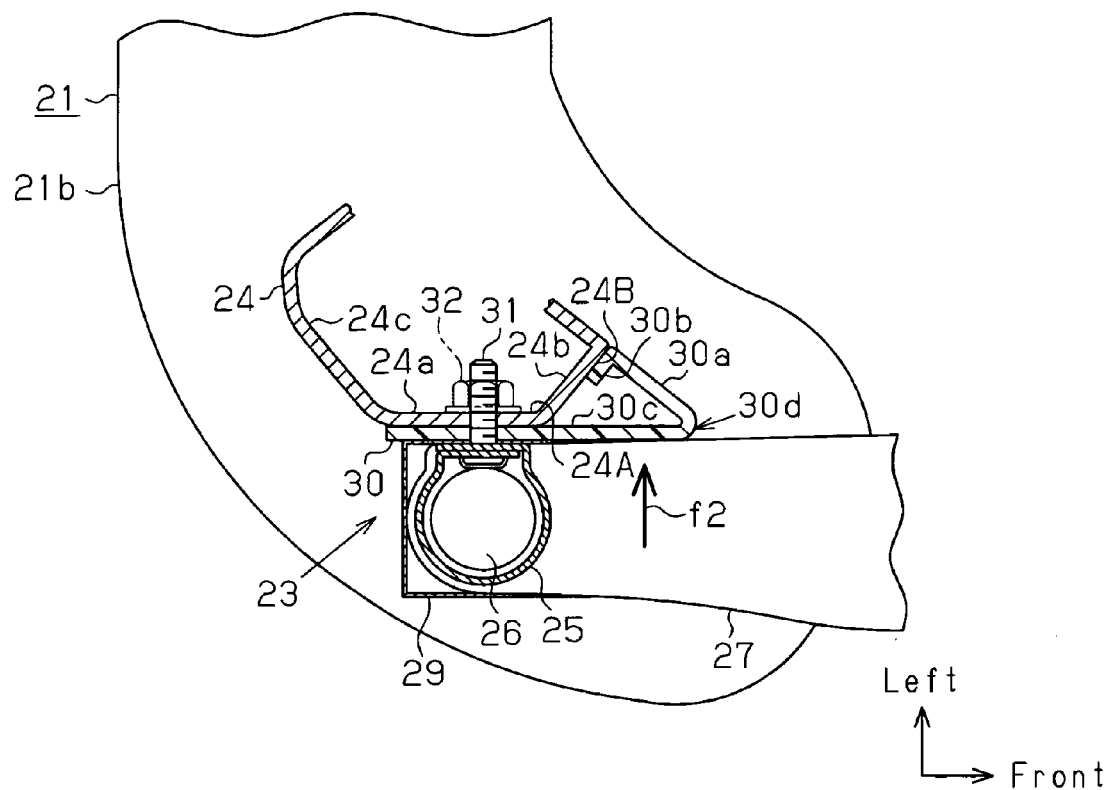
FIG. 5 is a cross-sectional plan view of the side airbag apparatus shown in FIG. 1, illustrating a state in which the airbag is inflated and deployed.

On the other hand, when an impact the magnitude of which is greater than or equal to a predetermined value is applied to the body side portion (the door 22) due to a collision with another vehicle, a control circuit (not shown) outputs a drive current to the inflator 26 based on a detection signal of the impact sensor. The drive current generates heat, which causes the gas generating agent in the inflator 26 to generate gas. The gas is injected into the airbag 27 through the gas outlets of the inflator 26, initiating the inflation and deployment of the airbag 27. The inflation and deployment of the airbag 27 breaks and opens the retaining cover 29. At this time, as shown in FIG. 5, a force f2 of the inflation and deployment of the airbag 27 is applied leftward (toward the interior of the vehicle) to the guide portion 30c of the guide member 30. The load of the force f2 is received by the second bending portion 30b contacting the front surface of the front wall 24b of the seat frame 24.

Thus, even if the guide portion 30c acts to be flexed toward the left side of the vehicle (toward the interior of the vehicle) by receiving the force f2 from the airbag 27, the first bending portion 30a serves as a prop and prevents the guide portion 30c from being flexed toward the left side of the vehicle. Then, the airbag 27, which is being inflated and deployed, is guided to the front of the vehicle, or toward the burst line portion 33, by the guide portion 30c. As a result, the airbag 27 breaks the burst line portion 33 and is inflated and deployed accurately in a space between the body side portion and the occupant P seated in the front seat 21 as shown in FIGS. 1 and 2. The occupant P is thus reliably protected.

The side airbag apparatus 23 according to the first embodiment, which has been described, has the following advantages.

(1) When the occupant P sits in the front seat 21 and leans against the seatback 21b, the guide member 30 receives the load f1 from the left side of the vehicle (from inside the vehicle). In this case, the first bending portion 30a is flexed toward the right side of the vehicle (toward the outside of the vehicle), so that the occupant P does not have sensation of foreign body in the back. On the other hand, when the airbag 27 is inflated and deployed, the guide portion 30c receives the force f2 from the right side of the vehicle (from the side closer to the outside of the vehicle). In this case, the first bending portion 30a functions as a prop, so that the guide portion 30c is prevented from being flexed toward the left side of the vehicle (toward the interior of the vehicle). Further, the first bending portion 30a is flexed away from the airbag 27 (toward the interior of the vehicle) with the guide portion 30c in between. Thus, when the airbag 27 is inflated and deployed, the first bending portion 30a does not interfere with the airbag 27. Therefore, the guide member 30 allows the airbag 27 to be inflated and deployed accurately toward the front of the vehicle, while maintaining the comfortableness of the front seat 21.

In addition, when another vehicle collides with the vehicle body side portion (the door 22), the first bending portion 30a even if the guide member 30 pushes the occupant P. Accordingly, the impact that the occupant P receives from the guide member 30 is reduced.

(2) The guide member 30 has the hinge 30d. Therefore, when the occupant P sits in the front seat 21 and leans against the seatback 21b, so that the guide member 30 receives the load f1 from the left side of the vehicle, the first bending portion 30a is reliably flexed toward the right side of the vehicle about the hinge 30d serving as a fulcrum.

(3) Since the hinge 30d is located at a front portion in the guide member 30, the first bending portion 30a can be located rearward of the hinge 30d.

(4) The first bending portion 30a functions not only as a flexible portion but also as a restriction portion. The guide member 30 is thus a multifunction type.

(5) The force f2 generated at the inflation and deployment of the airbag 27 acts on the guide portion 30c of the guide member 30. The load applied to the guide portion 30c from the right side of the vehicle is received by the second bending portion 30b. This reliably prevents the guide portion 30c from being flexed leftward.

(6) The retaining cover 29 is configured to be broken by the force of the inflation and deployment of the airbag 27. Therefore, the retaining cover 29 reliably retains the airbag 27 in a folded state, without hindering the inflation and deployment of the airbag 27.

(7) Being formed of thermoplastic elastomer (TPO), the guide member 30 can be made lighter than those made of metal. In addition, the guide member 30 is made of thermoplastic (TPO), which has a lower rigidity than that of metal. Therefore, when the occupant P gets in or gets out the vehicle, the back of the occupant P scrapes against the seatback 21b of the front seat 21. This cases the cover of the seatback 21b to contact the guide member 30. At this time, the influence on a part of the cover of the seatback 21b that contacts the guide member 30 is reduced. Therefore, the part of the cover of the seatback 21b that contacts the guide member 30 is inhibited from being whitened through the friction with the back of the occupant P.

Second Embodiment

A second embodiment of the present invention will now be described. The differences from the first embodiment will mainly be discussed.

Figure 6:
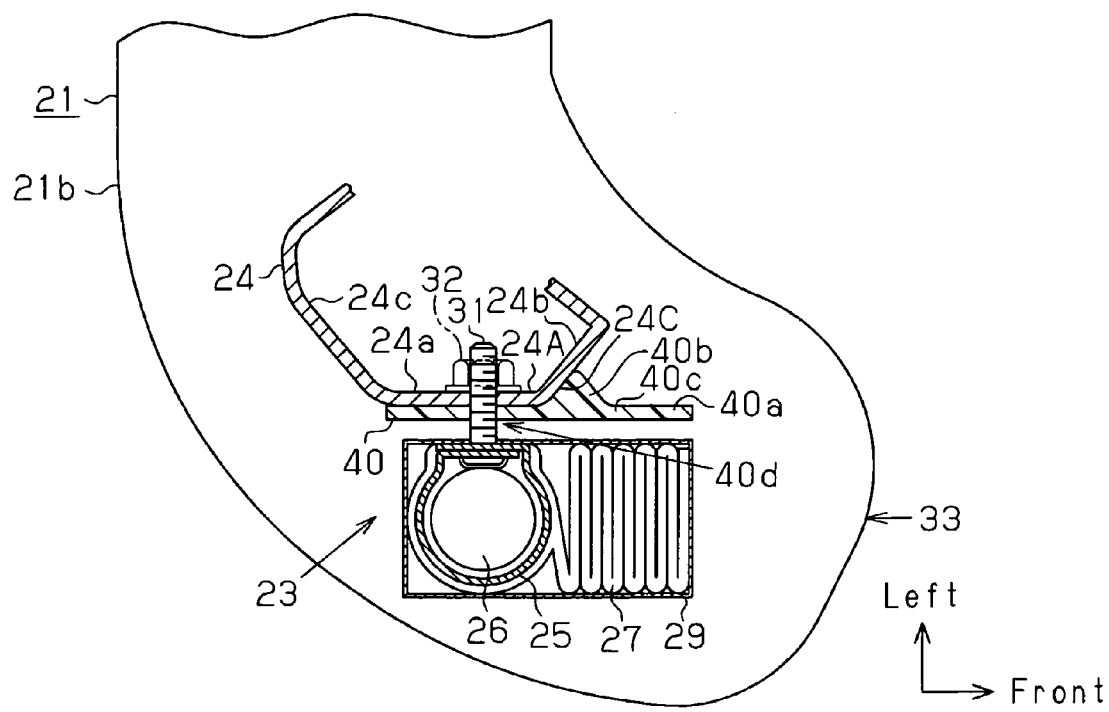
FIG. 6 is a cross-sectional plan view illustrating a side airbag apparatus according to a second embodiment of the present invention.

In place of the guide member 30 of the first embodiment, a side airbag apparatus 23 of the second embodiment has a guide member 40 shown in FIG. 6. A spacer (not shown) is located between the guide member 40 and the retaining cover 29 to create a gap. That is, the guide member 40 has a plate-like guide portion 40c, a hinge 40d, a flexible portion 40a, and a rib 40b. The guide portion 40c is fixed to the seat frame 24 with a bolt 31 extending in the front-rear direction. The hinge 40d is formed by a part of the guide portion 40c that is fixed with the bolt 31. The hinge 40d is located in a center of the guide portion 40c with respect to the front-rear direction. The flexible portion 40a is formed by a part of the guide portion 40c that is forward of the hinge 40d. The rib 40b is located on the left side surface of the flexible portion 40a and functions as a restriction portion and a contact portion. The rib 40b has an isosceles triangular cross section. The rear surface of the rib 40b contacts a rear end 24C of the front wall 24b of the seat frame 24. That is, the rear surface of the rib 40b contacts the front surface of the front wall 24b in the vicinity of the bent portion between the right side wall 24a and the front wall 24b in the seat frame 24.

Figure 7:
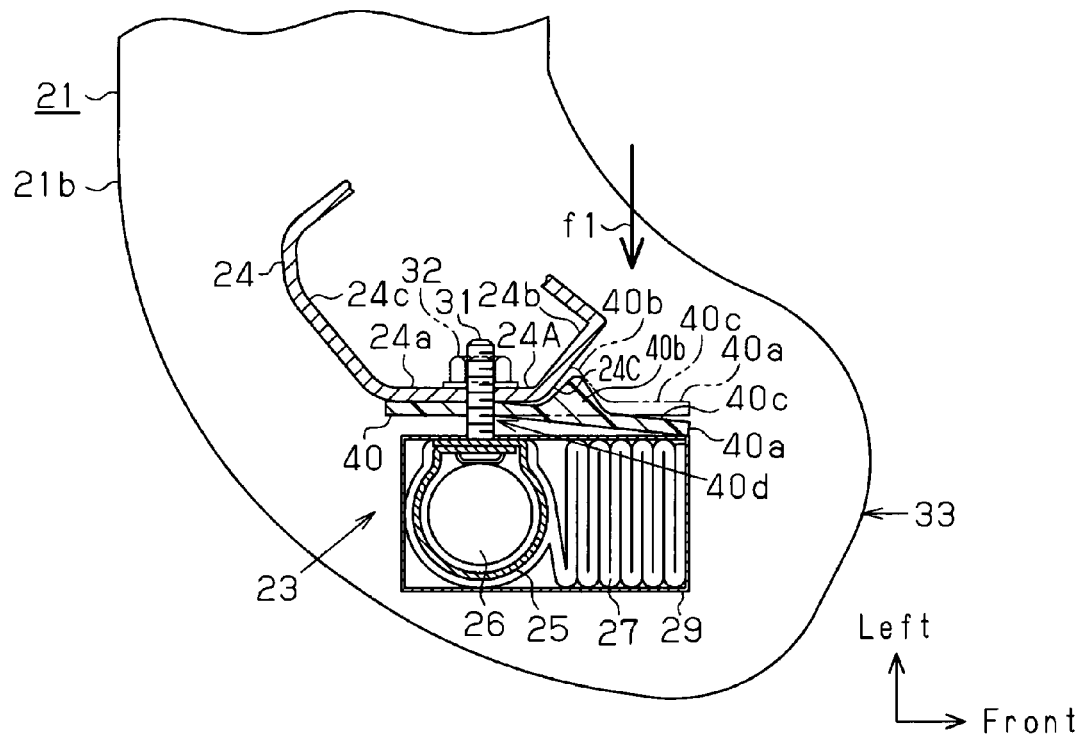
FIG. 7 is a cross-sectional plan view of the side airbag apparatus of FIG. 6, illustrating a state in which a flexible portion of a guiding member is flexed.

When the occupant P sits in the front seat 21 and leans against the seatback 21b, load f1 acts on the flexible portion 40a of the guide member 40 from the left side of the vehicle (from inside the vehicle) to the right (toward the outside the vehicle). Then, as shown in FIG. 7, the flexible portion 40a flexes in a collapsing manner toward the right side of the vehicle about the hinge 40d serving as a fulcrum. As a result, the occupant P is prevented from feeling disturbed by the guide member 40 when sitting in the front seat 21.

Figure 8:
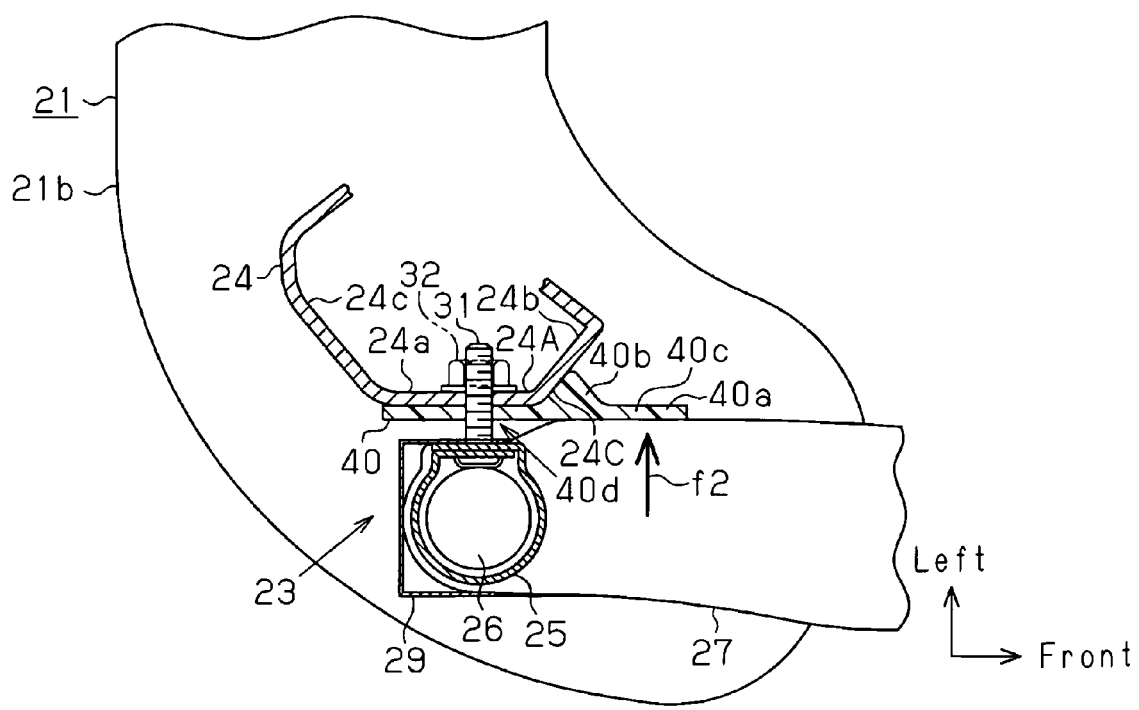
FIG. 8 is a cross-sectional plan view of the side airbag apparatus shown in FIG. 6, illustrating a state in which the airbag is inflated and deployed.

On the other hand, when another vehicle collides with the vehicle body side portion (the door 22), the airbag 27 is inflated and deployed as shown in FIG. 8. The force f2 of the inflation and deployment of the airbag 27 acts leftward (toward the interior of the vehicle) on the guide portion 40c of the guide member 40. However, the load of the force f2 of the inflation and deployment is received by the rib 40b contacting the front surface of the front wall 24b of the seat frame 24.

Thus, even if the guide portion 40c acts to flex leftward (toward the interior of the vehicle) by receiving the force f2 from the airbag 27, the rib 40b serves as an obstacle and prevents the guide portion 40c from being flexed leftward. Then, the airbag 27, which is being inflated and deployed, is guided to the front of the vehicle, or toward the burst line portion 33, by the guide portion 40c. Thus, the airbag 27 breaks the burst line portion 33 and is inflated and deployed accurately in a space between the body side portion and a part from the thorax to the lumbar region of the body of the occupant P seated in the front seat 21 as shown in FIGS. 1 and 2. At this time, the airbag 27 is inflated and deployed at a position corresponding to the thorax and the lumbar region of the occupant P. The occupant P is thus reliably protected.

The above described second embodiment has the following advantages.

(8) When the load f1 acting on the guide member 40 from inside the vehicle disappears, the flexible portion 40a, which has been flexed toward the outside of the vehicle, is quickly returned to the original position before being flexed by its own elastic restoring force. Thus, when the airbag 27 is inflated and deployed, the flexible portion 40a is inhibited from interfering with the airbag 27. As a result, variations in the inflating and deploying direction of the airbag 27 are reduced, so that the airbag is accurately inflated and deployed toward the front side of the vehicle.

(9) Since the hinge 40d is located at a center portion of the guide portion 40c in the front-rear direction, the flexible portion 40a can be arranged at a position forward of the hinge 40d.

(10) The restriction portion and the contact portion are formed by the rib 40b located on the left surface of the flexible portion 40a, the structure of the restriction portion and the contact portion is simplified.

Third Embodiment

A third embodiment of the present invention will now be described. The differences from the second embodiment will mainly be discussed.

Figure 9:
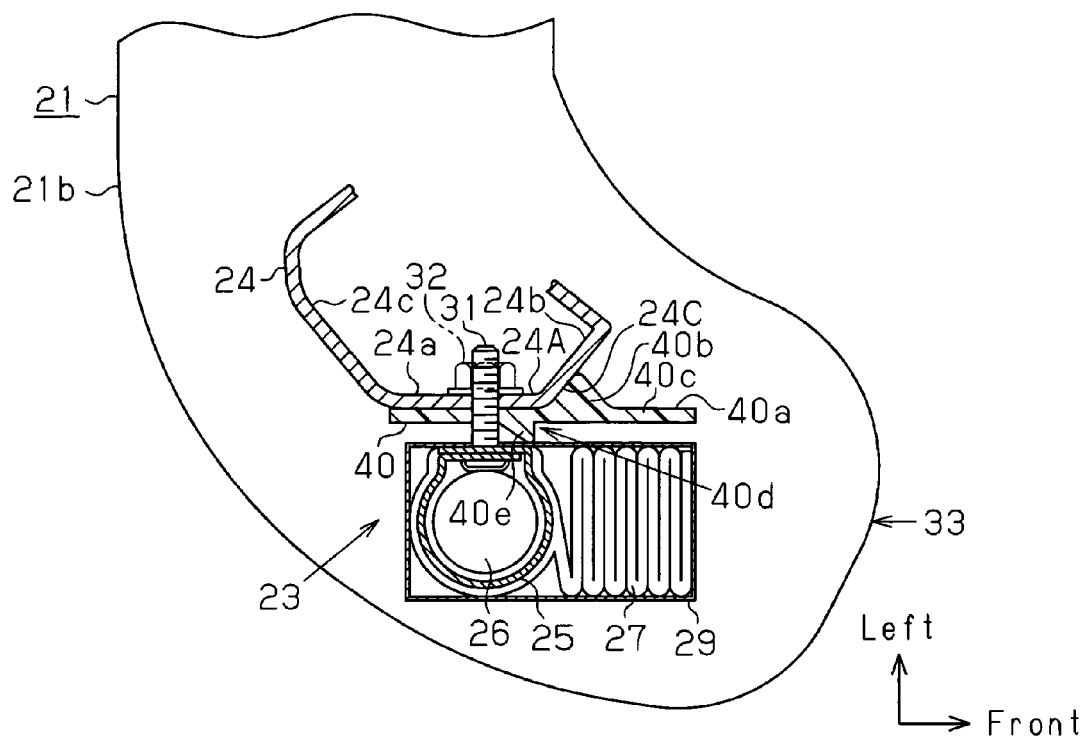
FIG. 9 is a cross-sectional plan view illustrating a side airbag apparatus according to a third embodiment of the present invention.

A side airbag apparatus 23 according to a third embodiment is different from the second embodiment in that a contact rib 40e on the right side surface of the guide portion 40c of the guide member 40 as shown in FIG. 9. The contact rib 40e has a right triangular cross section. The rear end of the contact rib 40e is adjacent to the bolt 31, and the distal end (right end) of the contact rib 40e contacts the retainer 25 with the retaining cover 29 and the airbag 27 in between. A hinge 40d is provided in a part of the guide portion 40c that is adjacent to the front end of the contact rib 40e. A flexible portion 40a is provided in a part of the guide portion 40c that is forward of the hinge 40d. The hinge 40d is located at a position that corresponds to the front end 24A of the right side wall 24a.

Figure 10:
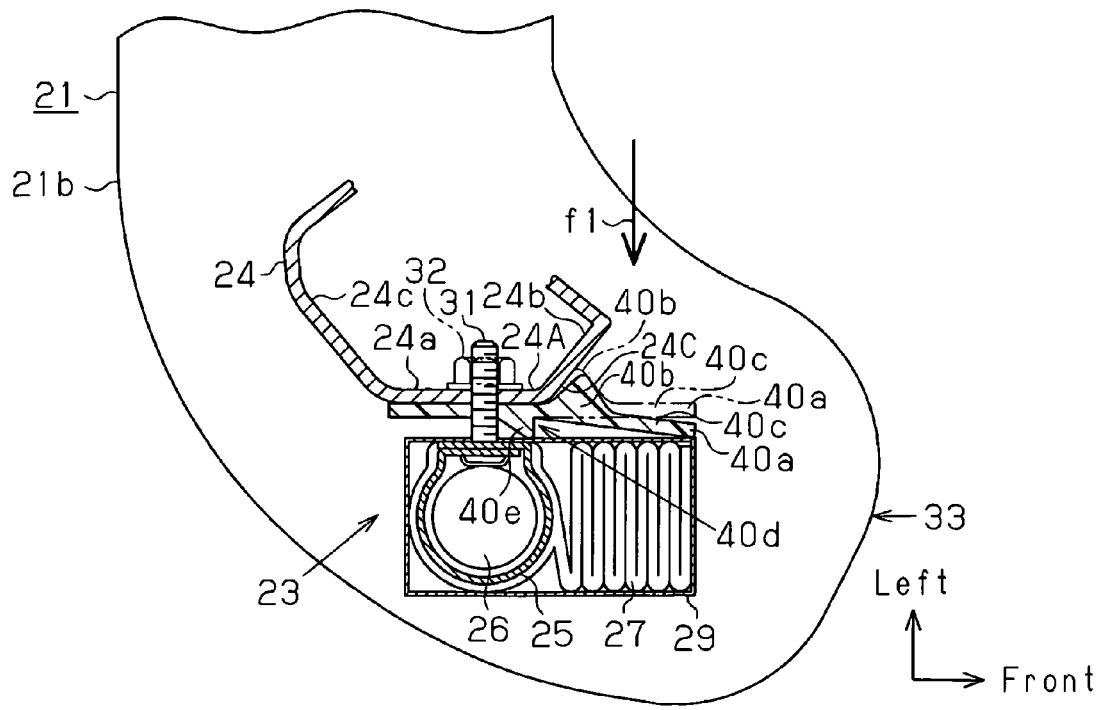
FIG. 10 is a cross-sectional plan view of the side airbag apparatus of FIG. 9, illustrating a state in which a flexible portion of a guiding member is flexed.

When the occupant P sits in the front seat 21 and leans against the seatback 21b, load f1 acts on the flexible portion 40a of the guide member 40 from the left side of the vehicle (from inside the vehicle) to the right (toward the outside the vehicle). Then, as shown in FIG. 10, the flexible portion 40a flexes in a collapsing manner toward the right side of the vehicle about the hinge 40d serving as a fulcrum. As a result, the occupant P is prevented from feeling disturbed by the guide member 40 when sitting in the front seat 21.

Since the operation of the inflation and deployment of the airbag 27 is the same as that of the second embodiment, the description thereof is omitted.

The above described third embodiment has the following advantages.

(11) The hinge 40d is located at a position that corresponds to the front end 24A of the right side wall 24a. Therefore, when the flexible portion 40a is flexed toward the right side of the vehicle in a collapsing manner about the hinge 40d serving as a fulcrum, no gap is created between the flexible portion 40a and the right side wall 24a of the seat frame 24. Thus, no foreign objects get caught in such a gap.

(12) Since the position where the contact rib 40e is formed is changed, so that the position of the hinge 40d is easily changed. The contact rib 40e may be located away from the hard retainer 25. In this case, a member that receives the contact rib 40e needs to be provided at a position contacting the contact rib 40e. Such a member needs to be formed of a material having a high rigidity such as metal.

(Modifications)

It should be noted that the embodiments shown above may be modified as follows.

Figure 11:
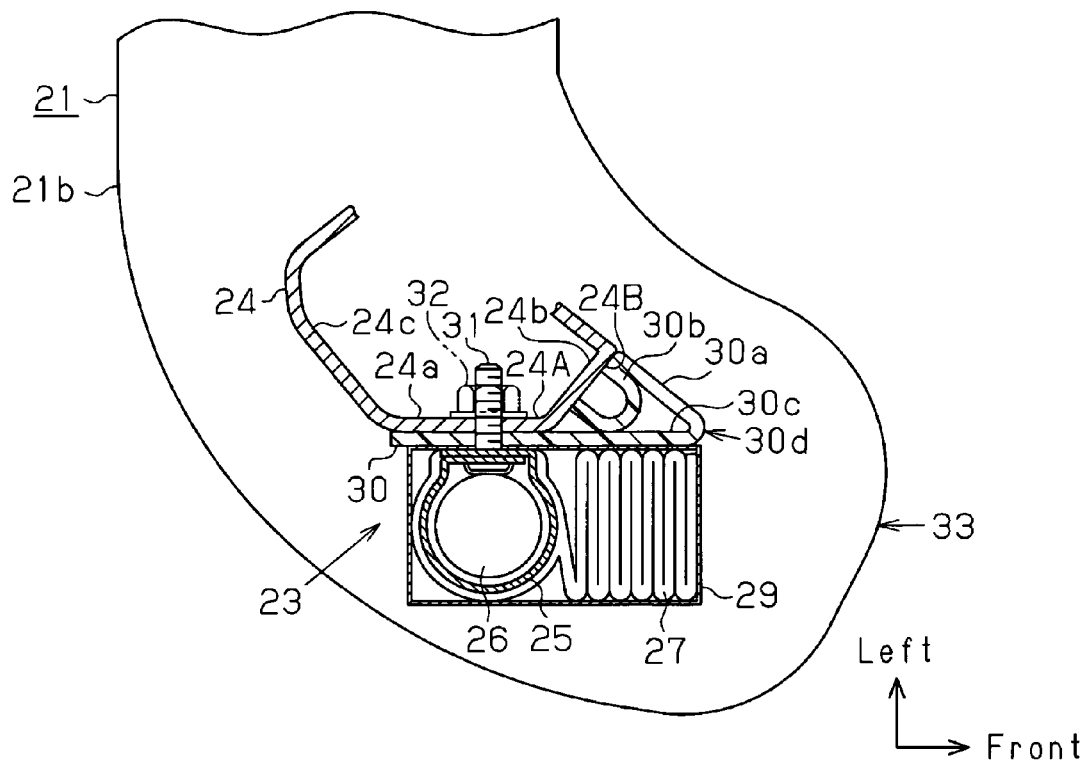
FIG. 11 is a cross-sectional plan view of a side airbag apparatus of a modified embodiment.

As shown in FIG. 11, the second bending portion 30b of the guide member 30 may be U-shaped and has an opening that opens diagonally backward left. In this case, the right end of the second bending portion 30b contacts the guide portion 30c. The rear end and the left end of the second bending portion 30b contact the front wall 24b of the seat frame 24.

Figure 12:
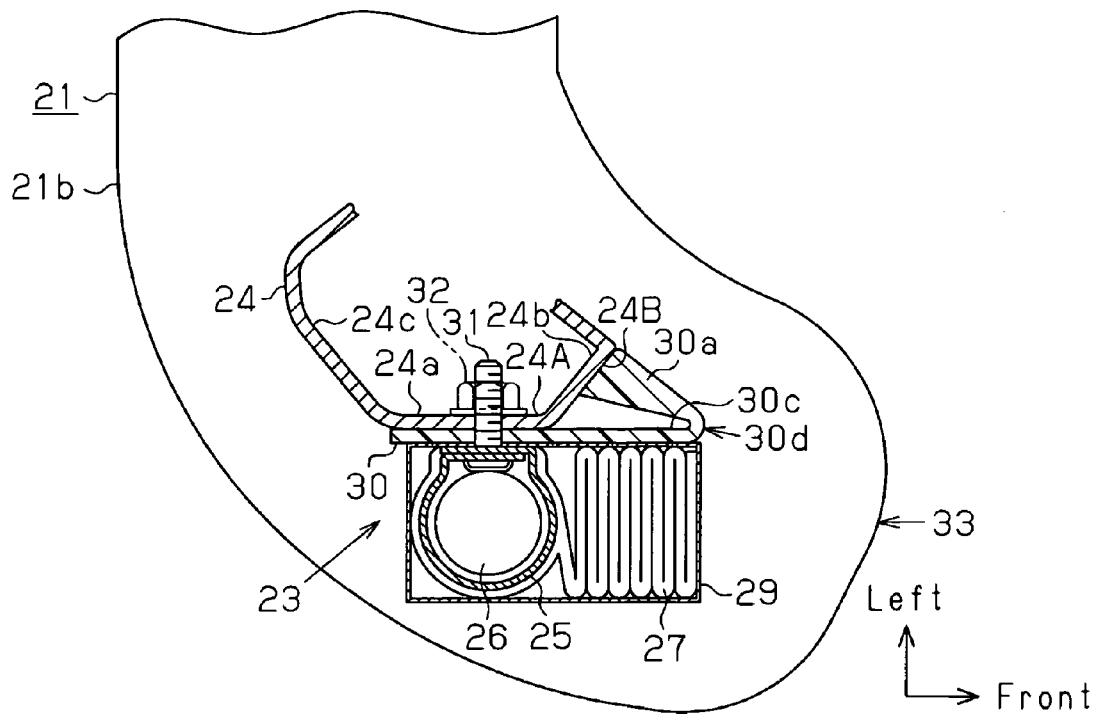
FIG. 12 is a cross-sectional plan view of a side airbag apparatus of another modified embodiment.
Figure 13:
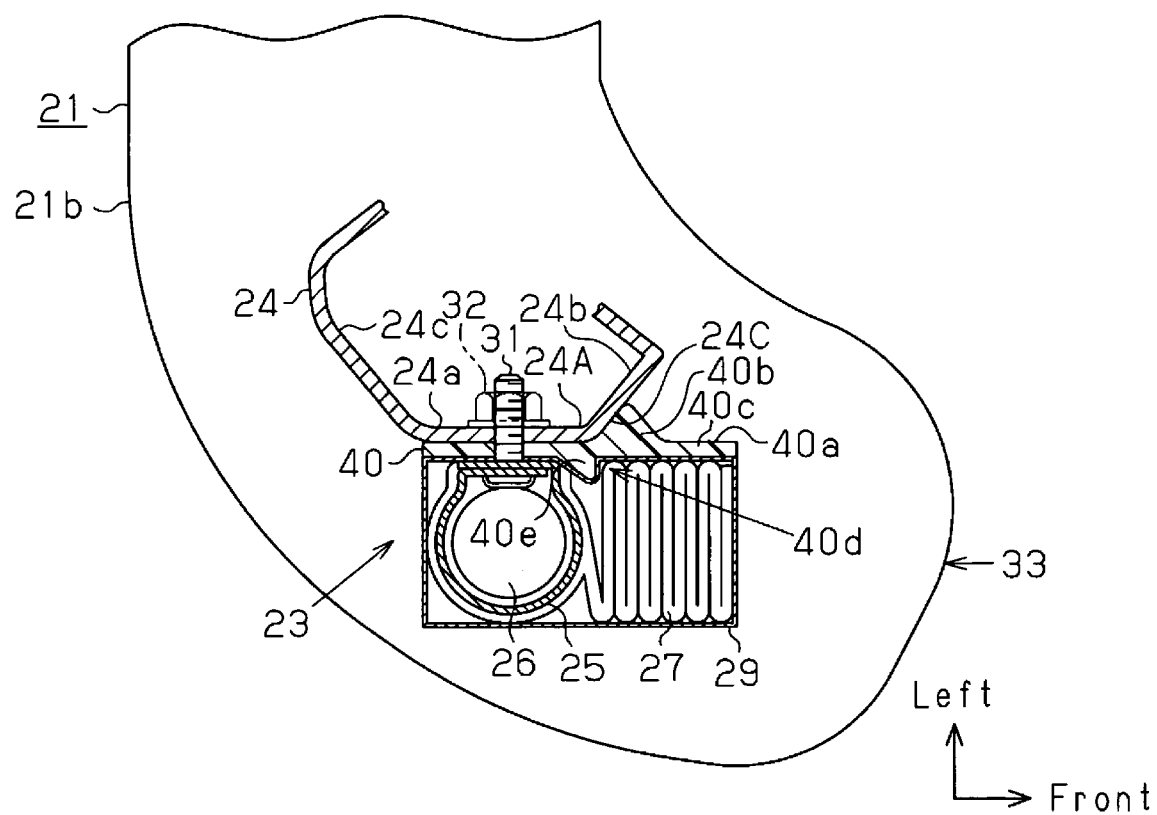
FIG. 13 is a cross-sectional plan view of a side airbag apparatus of a further modified embodiment.

As shown in FIG. 12, the first bending portion 30a of the guide member 30 according to the first embodiment may be widened diagonally backward left. In this case, the distal surface of the first bending portion 30a contacts the front surface of the front wall 24b of the seat frame 24. A gap that is widened toward the rear end is defined between the first bending portion 30a and the guide portion 30c.

In the first embodiment, the second bending portion 30b of the guide member 30 may extend diagonally forward left as long as the second bending portion 30b is maintained in a state contacting the front surface of the front wall 24b of the seat frame 24.

In the first embodiment, when the first bending portion 30a is flexed leftward about the hinge 30d serving as a fulcrum, the second bending portion 30b does not necessarily need to slide on the front surface of the front wall 24b from the front end 24B toward the rear end 24C. That is, the second bending portion 30b may be separated from the front wall 24b.

In the side airbag apparatus 23 according to each of the above embodiments, a synthetic resin case may be provided outside the retaining cover 29. In this case, the strength of the case is set to such a value that the case can be broken inflation and deployment of the airbag 27.

In the side airbag apparatus 23 according to each of the above embodiments, the retaining member may be configured by belt-like member, a cord-like member, or a thread-like member as long as it is capable of retaining the airbag 27 in a folded state and has such a strength that it can be broken when the airbag 27 is inflated and deployed.

In the side airbag apparatus 23 according to each of the above embodiments, the guide member 30 (the guide member 40) may be arranged to protrude further forward than the airbag 27, which is retained in a folded state in the retaining cover 29.

In the side airbag apparatus 23 of the second and third embodiments, the gap between the guide member 40 and the retaining cover 29 may be omitted. That is, the guide member 40 and the retaining cover 29 may be arranged to closely contact each other. In this case, the rib 40e contacts the retainer 25 with the retaining cover 29 and the airbag 27 in between while sinking into the retaining cover 29. The retaining cover 29 and the airbag 27 are made of a material softer than that of the guide member 30. Therefore, when a load acting toward the interior of the vehicle acts on the guide member 30, the flexible portion 40a is flexed toward the interior of the vehicle so as to sink into the retaining cover 29.

The airbag apparatus 23 of each of the above embodiments may be applied to the rear seat of a vehicle.

Therefore, the present examples and embodiments are to be considered as illustrative and not restrictive and the invention is not to be limited to the details given herein, but may be modified within the scope and equivalence of the appended claims.

What is claimed is:

1. A side airbag apparatus provided in a seatback of a vehicle seat, comprising:
   an airbag fixed in a folded state to a seat frame of the seatback, wherein when inflated and deployed by the pressure of gas, the airbag protrudes further toward the front of a vehicle than the seat frame and enters the space between a body side portion of the vehicle and an occupant seated in the vehicle seat; and
   a guide member located between the seat frame and the airbag, the guide member guiding the airbag such that the airbag is deployed toward the front of the vehicle when inflated and deployed,
   wherein the guide member includes:
   a guide portion that is located inboard of the airbag in the vehicle and arranged along the direction of inflation of the airbag;
   a flexible portion that is flexed toward the outside of the vehicle when receiving a load from inside the vehicle; and
   a restriction portion that restricts the guide portion from being flexed toward the interior of the vehicle when receiving a force generated by inflation and deployment of the airbag.

2. The side airbag apparatus according to claim 1, wherein the guide member has a hinge, which functions as a fulcrum when the flexible portion is flexed toward the outside of the vehicle.

3. The side airbag apparatus according to claim 2, wherein the hinge is located at a front end of the guide member in the front-rear direction of the vehicle.

4. The side airbag apparatus according to claim 2, wherein the guide member extends along the front-rear direction of the vehicle, and wherein the hinge is located at a center of the guide member in the longitudinal direction.

5. The side airbag apparatus according to claim 1, wherein the restriction portion is formed by a rib that is located on a side surface of the guide portion facing the interior of the vehicle.

6. The side airbag apparatus according to claim 1, wherein the flexible portion also functions as the restriction portion.

7. The side airbag apparatus according to claim 1, wherein the restriction portion includes a contact portion that contacts a part of the seat frame that is closer to the front of the vehicle, and
   wherein the contact portion receives load that is generated when the guide member receives the force of inflation and deployment of the airbag.

8. The side airbag apparatus according to claim 1, further comprising a retaining member that retains the airbag in a folded state,
   wherein the retaining member is broken and opened by the force of inflation and deployment of the airbag.

9. The side airbag apparatus according to claim 1, wherein the flexible portion has elasticity, wherein when receiving load from inside the vehicle, the flexible portion is flexed outward in the vehicle, and when the load is removed, the flexible portion is returned to the original position before being flexed by its own elastic restoring force.

10. The side airbag apparatus according to claim 1, wherein the guide portion is arranged to be separated from the airbag so as to allow the flexible portion to be flexed.

* * * * *